March 15, 1960    H. L. BURNS    2,928,415
CHECK VALVE HAVING BALANCED VALVE CONSTRUCTION
Filed Aug. 12, 1957

INVENTOR.
HENRY L. BURNS
BY

United States Patent Office 2,928,415
Patented Mar. 15, 1960

2,928,415

CHECK VALVE HAVING BALANCED VALVE CONSTRUCTION

Henry L. Burns, Portland, Oreg., assignor to Alar Products, Inc., a corporation of Ohio Application August 12, 1957, Serial No. 677,710

8 Claims. (Cl. 137—517)

My invention relates to check-valves and particularly those having a balanced valve construction.

An object of my invention is to provide an improved valve having a function of checking flow in a reverse direction and having a design to balance the pressure of the fluid.

Another object is to provide a unique and useful construction having superior operation results.

Another object is the provision of an improved valve construction designed and arranged to give superior control of the fluid therein.

Another object is the provision for a unique combination of features to provide useful and important results not heretofore obtained.

Figure 1:
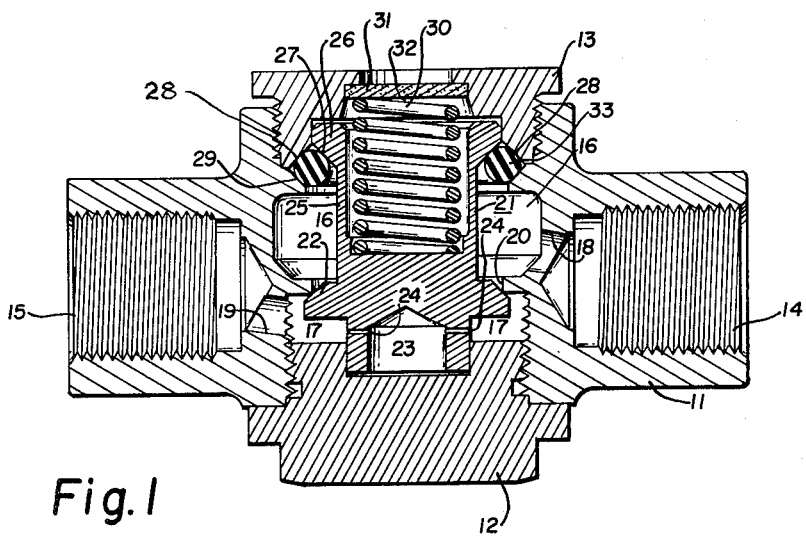
Figure 2:
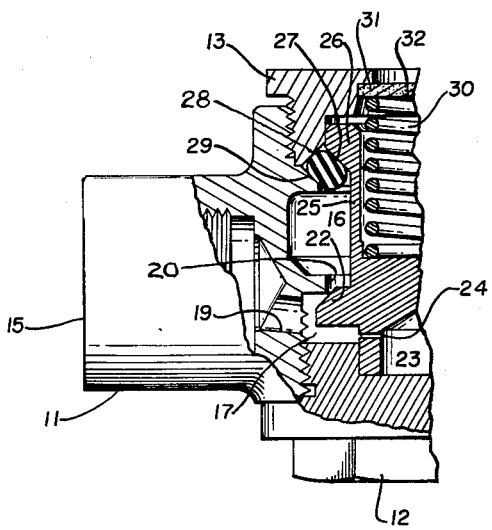

Other objects and a fuller understanding of my invention may be had by referring to the following description and claims, taken in conjunction with the accompanying drawing, in which:

Figure 1 is a longitudinal sectional view taken through my device and showing the valve in closed position; and Figure 2 is a partial sectional view like that shown in Figure 1 and showing the valve in an open position.

My device has a hollow casing 11 closed at one end by a plug member 12 threaded thereto. At the opposite side of the casing 11, there is a plug 13 having a central opening therethrough which is adapted to communicate with atmosphere or with a fluid at a reference pressure. Together, the integral casing 11, plug 12 and plug 13 make up the complete casing or housing in which the valve parts are mounted.

At one end of the casing 11, there is an inlet opening 14 adapted to be threadably connected with a source of fluid under pressure which flows into the casing through the inlet 14. At the other end of the casing 11, there is an outlet opening 15 which is adapted to be threadably connected with a conduit through which fluid is to be delivered from the valve device.

The casing 11 is divided by an intermediate wall into an upper or first chamber 16 and a lower or second chamber 17. An axially extending opening 20 provides communication between the chamber 16 and the chamber 17.

There is a passageway or port 18 in the wall of the casing 11 providing communication between the inlet opening 14 and the chamber 16. Also, there is a passageway or port 19 in the wall of the casing 11 which provides communication between the chamber 17 and the outlet opening 15.

Thus, fluid may flow from the inlet opening 14, through the port 18, through the chamber 16, through the opening 20, through the chamber 17, through the port 19, and thence out through the outlet opening 15.

Axially mounted within the casing between the opposite plugs 12 and 13 is a valve body denoted generally by the reference character 21. The valve body 21 has a check valve portion 22 disposed in the chamber 17 and arranged to close the opening 20 when moved upwardly toward the chamber 16 and to open the opening 20 when moved downwardly in the chamber 17. The check valve portion 22 is adapted to seat on the valve seat provided by the annular edge of the opening 20.

There is a hollow cylindrical portion 23 disposed axially in the valve body 21 from the lower end thereof as shown in the drawing. The end of this cylindrical portion 23 functions as a piston in a sliding fit with a complementary closed cylindrical bore in the plug 12. The axially disposed bore in 23 and radially extending small openings 24 assure a vent to chamber 17 for any fluid pressures that might be trapped at the end of the cylindrical portion 23.

The valve body 21 has a hollow cylindrical portion 25 extending axially thereof and having at its end, opposite from the portion 22, an enlarged cylindrical head or piston portion 26. This piston portion 26 is in a close sliding fit with a complementarily cylindrical bore in the plug 13. Thus, the valve body 21 is arranged to reciprocate along its axis between the plugs 12 and 13 and to be guided by its cylindrically-shaped ends in corresponding cylindrically-shaped bores in the respective plugs 12 and 13.

An O-ring 33 of rubber or rubber-like material, having a round cross-section as shown, is positioned to provide a seal between the piston portion 26 and the cylindrical wall of the bore in which it reciprocates. This O-ring 33 is resiliently compressible by reason of the nature of the material of which it is made. The O-ring 33 is positioned circumferentially around the valve body 21 and is positioned in a groove or recess made up of contact surfaces 27, 28 and 29. The contact surface 27 is a part of the valve body 21 and is disposed at substantially a 45-degree angle to the axis of the valve body 21. The contact surface 28 is an inner wall of the plug 13 and this surface 28 is also disposed at a 45-degree angle to the axis of the valve body 21 inclined in the opposite direction. Measuring the angles in the same direction, the contact surface 27 may be considered as being substantially 45 degrees to the axis of the valve body and the contact surface 28 may be considered as being at substantially 135 degrees to the axis of the valve body. The contact surface 29 is a wall surface of the casing 11 and it, too, is inclined at substantially a 45-degree angle to the axis of the valve body 21. In other words, the contact surfaces 27 and 29 are substantially parallel to each other when seen in cross-section and the contact surface 28 is substantially at right angles to the contact surfaces 27 and 29 when seen in cross-section. Of course, all three contact surfaces 27, 28 and 29 in plan view are annular in shape and extend circumferentially around the valve body.

It is to be noted that the cylindrical plane of the outer cylindrical surface of the piston portion 26 and the cylindrical bore in which it fits when projected bisects the cross-sectional area of the O-ring 33. In other words, the cross-sectional area of the O-ring 33 is disposed equally inwardly and outwardly of the phantom cylinder projected therethrough from the cylindrical outer surface of the piston portion 26 and the cylindrical bore within which it reciprocates.

Pressure of fluid within the chamber 16 presses the O-ring equally against the surfaces 27 and 28. It maintains a seal between the plug 13 and the valve body 21 as the valve body reciprocally moves.

Upon movement of the valve body 21 from its position shown in Figure 1 to its position shown in Figure 2, the opposed surfaces 27 and 29 compress the O-ring 33 therebetween and cause it to assume the distorted appearance shown in Figure 2. While thus compressed, its resistance to compression resiliently urges the valve body upwardly back toward the position shown in Figure 1. A good seal is maintained by the arrangement of the O-ring 33 relative to the contact surfaces 27, 28 and 29 and a considerable amount of play or movement is permitted for the valve body 21 by reason of the compressibility of the O-ring while still maintaining its good sealing contact. There is an absence of sliding friction and of a breakaway friction, inasmuch as the O-ring maintains contact with the three contact areas 27, 28 and 29 in both of the positions of the valve body and throughout the movement of the valve body.

A coil spring 30 is positioned to resiliently urge the valve body 21 downwardly, that is, to open position. The coil spring 30 is positioned within the hollow cylindrical portion 25 and has one end abutting the inner transverse wall of the valve body 21. The cavity of the plug 13 above the valve body 21, together with the cavity of the hollow cylindrical portion 25, form a chamber 32. A circular disc or abutting member 31 is positioned within the plug 13 and under the shoulder shown at the central opening in the plug 13. This circular disc 31 is preferably of porous, sintered, stainless steel and it forms an abutment against which the spring 30 engages and at the same time functions as a filtered passageway between chamber 32 and the central opening in the plug 13. Thus, the interior of the valve body 21, in which the spring 30 is located, and the space between the upper end of the valve body 21 and the plug 13, is vented to atmosphere or to a fluid at a reference pressure. Thus, movement of the valve body 21 upwardly to the position shown in Figure 1 encounters a pressure the same as atmospheric pressure or the same as a fluid at a reference pressure.

The surface of the check valve portion 22 of the valve body 21 and within the chamber 17 is such that fluid pressure within the chamber 17 urges the valve body upwardly and to the closed position shown in Figure 1. In moving the valve body 21 to closed position, the fluid pressure in the chamber 17 must overcome the resiliency of the spring 30 which urges the valve body 21 to its open position. In this manner, the check valve portion 22 acts as a check valve so as to close off the opening 20 when the fluid pressure in chamber 17 is sufficiently greater than the atmospheric or reference pressure in chamber 32 to overcome the predetermined strength or resilient force of the spring 30. However, when the fluid pressure in the chamber 17 has dropped sufficiently below that of the atmospheric or reference pressure in chamber 32, then the valve body 21 is moved to the position shown in Figure 2 and thus opens the opening 20 to permit the flow of fluid to continue through the opening 20. By reason of the balanced valve construction of the parts within the chamber 16, variations in the pressure of the fluid on the inlet side, that is, within the chamber 16, do not move the valve body in either opening or closing position. The opposed surfaces of the valve body subject to fluid pressure within the chamber 16 are such that the force of fluid pressure urging the valve to closed position is counter-balanced by the forces urging the valve to open position. There is thus provided an efficient check valve function which is independent of the variaiton of fluid pressure on the inlet side. As desired, the areas exposed to fluid pressure in the chamber 16 may be in complete or perfect balance or may be in such ratio balance as is desired to maintain a reference pressure in the chamber 16 against which the fluid pressure in the chamber 17 works to move the valve body 21.

As will be apparent to those skilled in the art, my new construction provides new uses and functions for fluid systems not heretofore obtainable in such an efficient and simple manner.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A valve structure comprising in combination, a valve casing having an inlet opening and an outlet opening, said casing having a first chamber in communication with said inlet and a second chamber in communication with said outlet, said chambers being in axial alignment and having an opening extending axially therebetween for providing communication between said chambers, a valve body positioned in said chambers and through said opening and movable axially of said chambers and opening, said valve body having a check-valve portion positioned in said second chamber to close said opening upon being moved toward said first chamber and to open said opening upon being moved away from said first chamber, said casing having a cylindrical bore in axial alignment with said chambers and said opening, said valve body having a cylindrical piston portion slidably engaging the walls of said bore and reciprocal therein, said casing and valve body having an annular groove concentric with the valve body and adjacent said piston portion, an O-ring seal of resilient rubber-like material positioned in said groove, said groove being defined by a first annular seal-contact surface carried by said valve body and second and third annular seal-contact surfaces carried by said casing, said O-ring seal being exposed to fluid pressure in said first chamber and sealingly engaging said seal-contact surfaces, the projected cylinder coinciding with said bore bisecting the said O-ring whereby fluid pressure on said O-ring causes said O-ring to be pressed substantially equally on said valve body and casing, the said O-ring being resiliently compressible between opposed seal-contact surfaces to permit movement of the valve body toward said second chamber, and a spring carried by said casing and resiliently urging said valve body toward said second chamber.

2. In a valve structure comprising in combination, a casing having an inlet and an outlet, said casing having a first chamber communicating with said inlet and a second chamber communicating with said outlet, a valve body having a balancing-valve portion positioned in said first chamber and a check-valve portion positioned in said second chamber, said balancing-valve portion having oppositely disposed areas subject to fluid pressure in said first chamber and disposed to substantially neutralize movement of the valve body by fluid pressure in said first chamber, said check-valve portion having an area subject to fluid pressure in said second chamber and an area subject to a reference pressure, sealing means between said valve body and said casing and disposed to seal fluid pressure in said first chamber from said reference pressure, said sealing means being resiliently yieldable and disposed upon being compressed to resiliently urge said check-valve portion toward closed position, a spring in said casing resiliently and constantly urging said check-valve portion to open communication between said chambers, fluid pressure in said second chamber opposing said spring to close communication between said chambers upon overcoming said spring, operation of said check-valve portion being unopposed by excess of fluid pressure in said first chamber.

3. In a valve structure comprising in combination a casing having an inlet and an outlet, said casing having a first chamber communicating with said inlet and a second chamber communicating with said outlet, a valve body movable axially of said casing for controlling communication between said first and second chambers, said valve body in said first chamber having opposed surfaces subject to fluid pressure in said first chamber to balance tendency of the valve body to move under the force of fluid pressure in said first chamber, said valve body in said second chamber having a surface subject to fluid pressure in said second chamber and disposed to move the valve body to a position closing communication between said chambers, a resiliently yieldable member disposed around said valve body and disposed intermediate opposed shoulders on said valve body and said casing to be compressed therebetween upon movement of the valve body in a direction to open communication between said chambers, said yieldable member upon being compressed resiliently resisting said movement of the valve body in said direction, and a spring in said casing resiliently and constantly urging said valve body in a direction to open communication between said chambers, action of said valve body to move in direction to open and close communication between said chambers being substantially independent of variation in fluid pressure in said first chamber by the balancing action of said opposed surfaces in said first chamber.

4. In a valve structure comprising in combination a casing having an inlet and an outlet, said casing having a first chamber communicating with said inlet and a second chamber communicating with said outlet, a valve body movable axially of said casing for controlling communication between said first and second chambers, said valve body in said first chamber having opposed surfaces subject to fluid pressure in said first chamber to balance tendency of the valve body to move under the force of fluid pressure in said first chamber, said valve body in said second chamber having a surface subject to fluid pressure in said second chamber and disposed to move the valve body to a position closing communication between said chambers, a spring in said casing resiliently urging said valve body in a direction to open communication between said chambers, action of said valve body to move in direction to open and close communication between said chambers being substantially independent of variation in fluid pressure in said first chamber by the balancing action of said opposed surfaces in said first chamber, and a resiliently compressible seal in said first chamber and subject to fluid pressure therein for providing a seal between said valve body and casing and permitting reciprocal movement of the valve body relative to the casing.

5. In a valve structure, the combination of balanced-valve means for permitting movement of a valve subject to a reference pressure substantially without interference by variation in fluid pressure on the inlet side of the valve, check-valve means for closing the valve by fluid pressure on the outlet side of the valve in excess of said reference pressure, said balanced-valve means and check-valve means being interconnected to provide for movement of the check-valve means unhindered by variation in the fluid pressure on the inlet side of the valve, means engaging said valve to permit movement of said valve and to seal said inlet pressure from said reference pressure.

6. The combination of first means for controlling communication through a valve port in response to fluid pressure on the outlet side of the port relative to a reference fluid pressure, second means for neutralizing action of variations in fluid pressure on the inlet side of the port on the operation of the first means, third means for sealing the fluid pressure on the inlet side from the said reference fluid pressure, and fourth means resiliently opposing movement of said first means in response to excess of fluid pressure on the outlet side relative to said reference fluid pressure.

7. The combination in a fluid control valve of a casing, a valve body reciprocal therein, a spring urging the valve body to open position, the valve body having a surface subject to fluid pressure on the outlet side whereby fluid pressure on the outlet side urges the valve body to closed position in opposition to the spring, said valve body having opposed surfaces subject to fluid pressure on the inlet side and arranged to neutralize urging of the valve body to movement by increase of fluid pressure on the inlet side, and a resiliently compressible O-ring urging said valve body to closed position and maintaining a seal between said valve body and said casing during movement of the valve body, the bias of said O-ring being such that the bias of said spring plus fluid pressure on the outlet side in excess of a reference pressure acting on said valve body overcomes the bias of said O-ring.

8. The combination in a fluid control valve of a casing, a valve body reciprocal therein, the valve body having a surface subject to fluid pressure on the outlet side whereby fluid pressure on the outlet side urges the valve body to closed position, said valve body having opposed surfaces subject to fluid pressure on the inlet side and arranged to neutralize urging of the valve body to movement toward opened and closed position by variation of fluid pressure on the inlet side, biasing means urging said valve body toward open position regardless of the disposition of said casing, and a resiliently compressible O-ring seal urging said valve body in opposition to said biasing means to closed position and maintaining a seal between said valve body and said casing during movement of the valve body, said biasing means and O-ring being so balanced as to permit movement of the valve body to open position by fluid pressure on the outlet side in excess of a reference pressure.

References Cited in the file of this patent

UNITED STATES PATENTS

| | | |
|---|---|---|
| 2,192,258 | Chandler | Mar. 5, 1940 |
| 2,574,054 | Miller | Nov. 6, 1951 |
| 2,692,114 | Fullwood | Oct. 19, 1954 |